(12) United States Patent
Huth et al.

(10) Patent No.: US 7,841,636 B2
(45) Date of Patent: Nov. 30, 2010

(54) GARNISH SEAL AND ASSEMBLY FOR A VEHICLE

(75) Inventors: Sarah Jennifer Huth, Dublin, OH (US); Shinichi Yamase, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 3 days.

(21) Appl. No.: 12/363,900

(22) Filed: Feb. 2, 2009

(65) Prior Publication Data

US 2010/0194140 A1   Aug. 5, 2010

(51) Int. Cl.
 *B60R 13/02* (2006.01)
(52) U.S. Cl. .................................. 296/1.08; 49/490.1
(58) Field of Classification Search ............... 296/146.9, 296/146.7, 93, 1.08, 39.1, 135, 107.05; 49/490.1, 49/498.1
See application file for complete search history.

(56) References Cited

U.S. PATENT DOCUMENTS

| | | | | |
|---|---|---|---|---|
| 4,263,750 A | * | 4/1981 | Hein | ........................ 49/490.1 |
| 4,396,221 A | * | 8/1983 | Morgan et al. | ........... 296/96.11 |
| 4,894,968 A | * | 1/1990 | Vaughan | ................. 52/204.597 |
| 5,096,208 A | * | 3/1992 | Westberg | ..................... 277/641 |
| 6,716,496 B2 | | 4/2004 | Nakajima et al. | |
| 6,811,194 B1 | | 11/2004 | Gaertner et al. | |
| 2008/0122251 A1 | | 5/2008 | Okajima et al. | |

FOREIGN PATENT DOCUMENTS

JP          09-086302          3/1997

* cited by examiner

*Primary Examiner*—Dennis H Pedder
(74) *Attorney, Agent, or Firm*—Rankin Hill & Clark LLP

(57) ABSTRACT

An assembly for a vehicle includes a garnish including a base section, an outer wall projecting away from the base section, and a tab projecting away from at least one of the base section and the outer wall. The tab includes a seal attachment section spaced from the outer wall. The assembly further includes a seal including a base portion, having an interior section, an exterior section and an interconnecting section connecting the interior section and the exterior section. The seal mounts to the garnish by receiving the seal attachment section between the interior section and the exterior section of the base.

19 Claims, 4 Drawing Sheets

US 7,841,636 B2

GARNISH SEAL AND ASSEMBLY FOR A VEHICLE

BACKGROUND

The present disclosure relates to garnishes and weatherseals for attachment around vehicle door openings and other vehicle ports.

It is known to mount weatherseals to garnishes, which are also referred to as trim pieces, near vehicle ports and door openings to prevent the ingress of water and also to prevent the ingress of sound waves. Typically the garnish attaches to and is firmly supported by the vehicle body. Where the garnish cantilevers from a portion of the vehicle body, a problem arises in fixing the seal and attaching the garnish to the vehicle body.

SUMMARY

An example of an assembly that can overcome the aforementioned problem includes a garnish including a base section, an outer wall projecting away from the base section, and a tab projecting away from at least one of the base section and the outer wall. The tab includes a seal attachment section spaced from the outer wall. The assembly further includes a seal including a base portion, having an interior section, an exterior section and an interconnecting section connecting the interior section and the exterior section. The seal mounts to the garnish by receiving the seal attachment section between the interior section and the exterior section of the base.

An example of a garnish that can overcome the aforementioned problem includes a base section, an outer wall, and at least one tab. The outer wall is integrally formed with and projects away from the base section. The at least one tab connects with at least one of the base section and the outer wall and includes a seal attachment section projecting in a same general direction as the outer wall. The seal attachment section is configured to provide a location for attaching an associated seal to the garnish, where the associated seal has a base portion and a seal portion extending away from the base portion. The seal attachment section of the tab and the outer wall of the garnish define a space configured to receive a section of the base portion of the associated seal.

Another example of a garnish that can overcome the aforementioned problem includes an integrally formed piece of plastic including a base section, an outer wall and a tab. The tab includes a ramped section having a thinner section adjacent a distal edge of the tab and an opening spaced from the distal edge.

DETAILED DESCRIPTION

Figure 1:
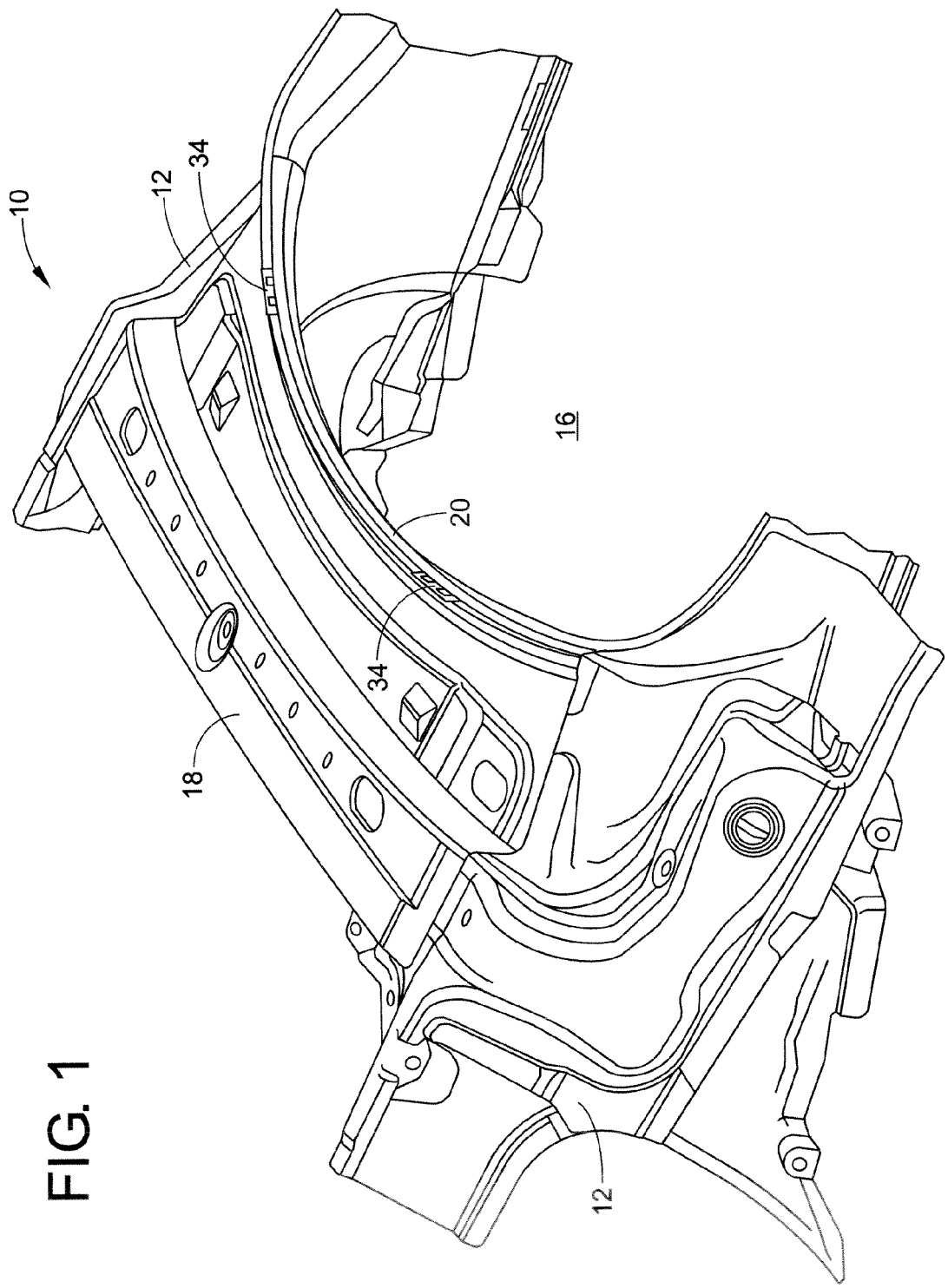
FIG. 1 is schematic perspective view showing part of a vehicle body of a vehicle near a rear port of the vehicle.

With reference to FIG. 1, a vehicle body 10 (only a portion shown) for a vehicle includes rear pillars 12 on opposite lateral sides of the vehicle body and rear roof rails, lower rear roof rail 14 and upper rear roof rail 18, that each extend in the lateral direction of the vehicle and interconnect the rear pillars 12. The rear pillars 12 and the rear roof rails 14 and 18 connect with one another in a conventional manner, e.g. welds or rivets and can be made from metal. The upper rear roof rails 18 and the lower rear roof rail 14 could be made from one piece of material, e.g., metal. A portion of the vehicle body 10 near the rear end of the vehicle is shown in FIG. 1. The rear roof rails 14,18 and the rear pillars 12 partially define a rear port 16 for the vehicle. The rear port 16 is typically covered by a tailgate (not shown), which pivots from a closed position to an open position to provide access to the inside of the vehicle through the rear port 16. The upper rear roof rail 18 attaches to an upper surface of the lower rear roof rail 14 and a garnish 20 attaches to a lower surface of the lower rear roof rail 14. The garnish 20 in the depicted embodiment is plastic.

Figure 2:
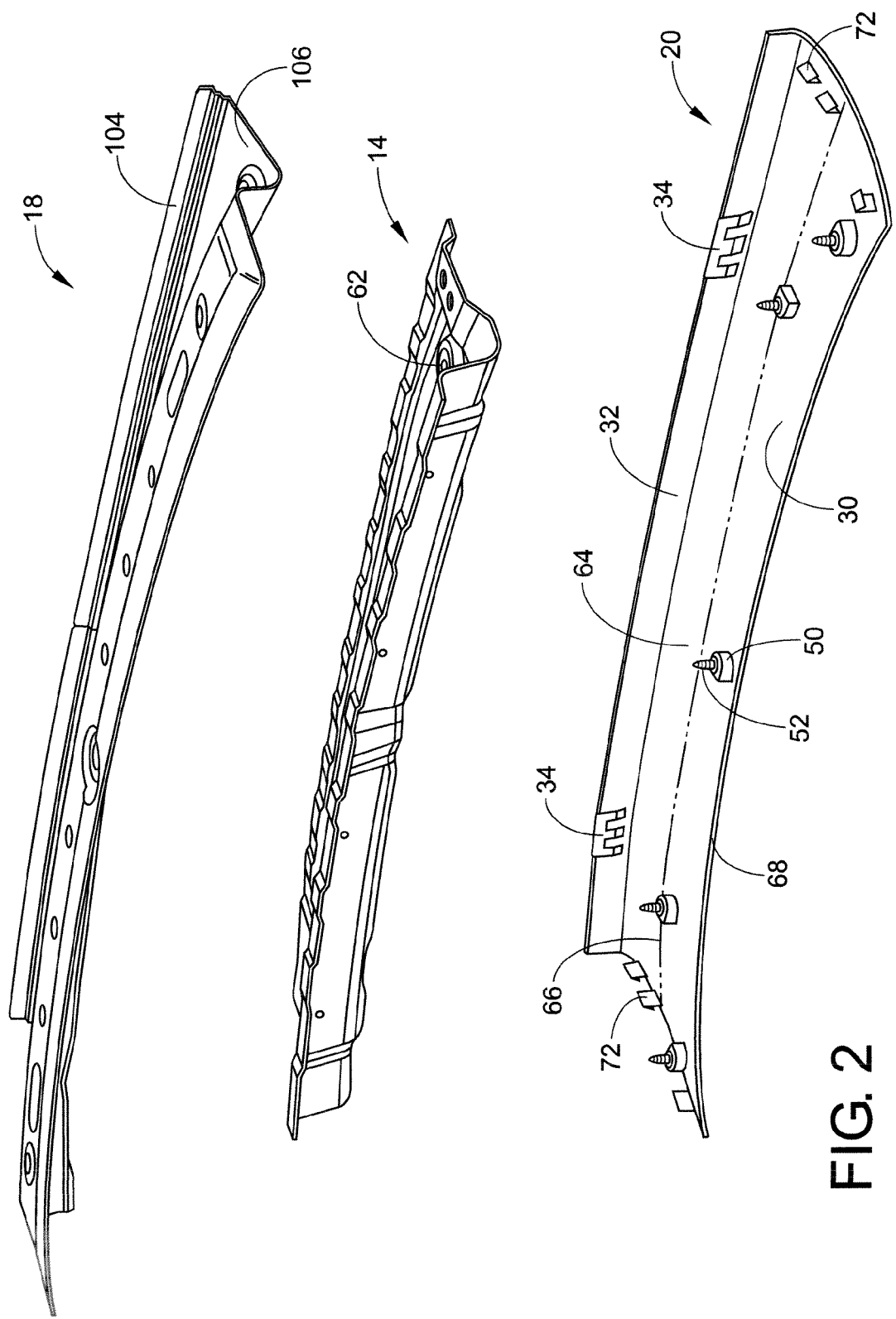
FIG. 2 is a schematic exploded view of a garnish, an upper rear roof rail and a lower rear roof rail of the vehicle body shown in FIG. 1.
Figure 3:
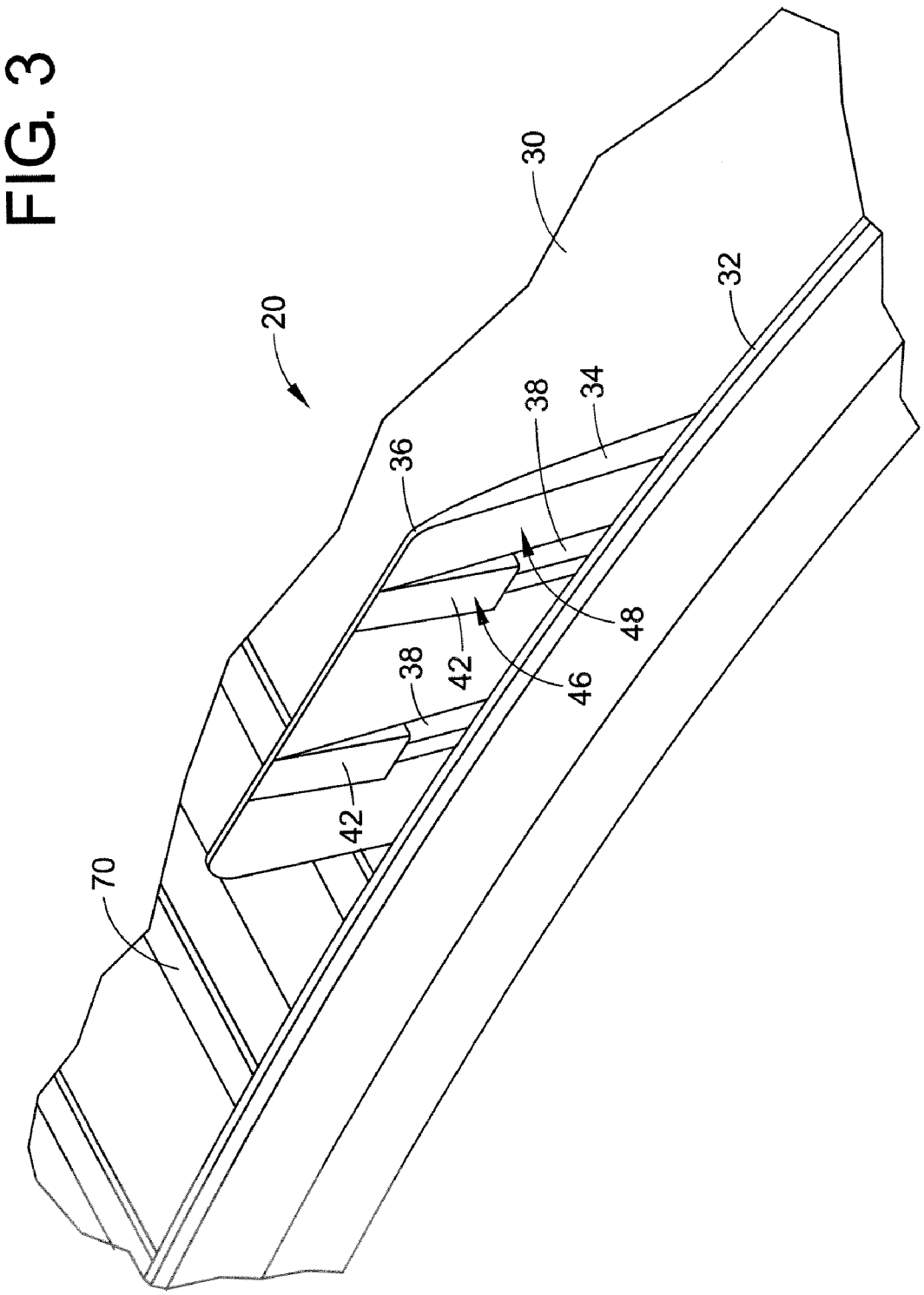
FIG. 3 is a close-up perspective view of a portion of the garnish shown in FIG. 2 showing a tab of the garnish to which a weather seal attaches.
Figure 4:
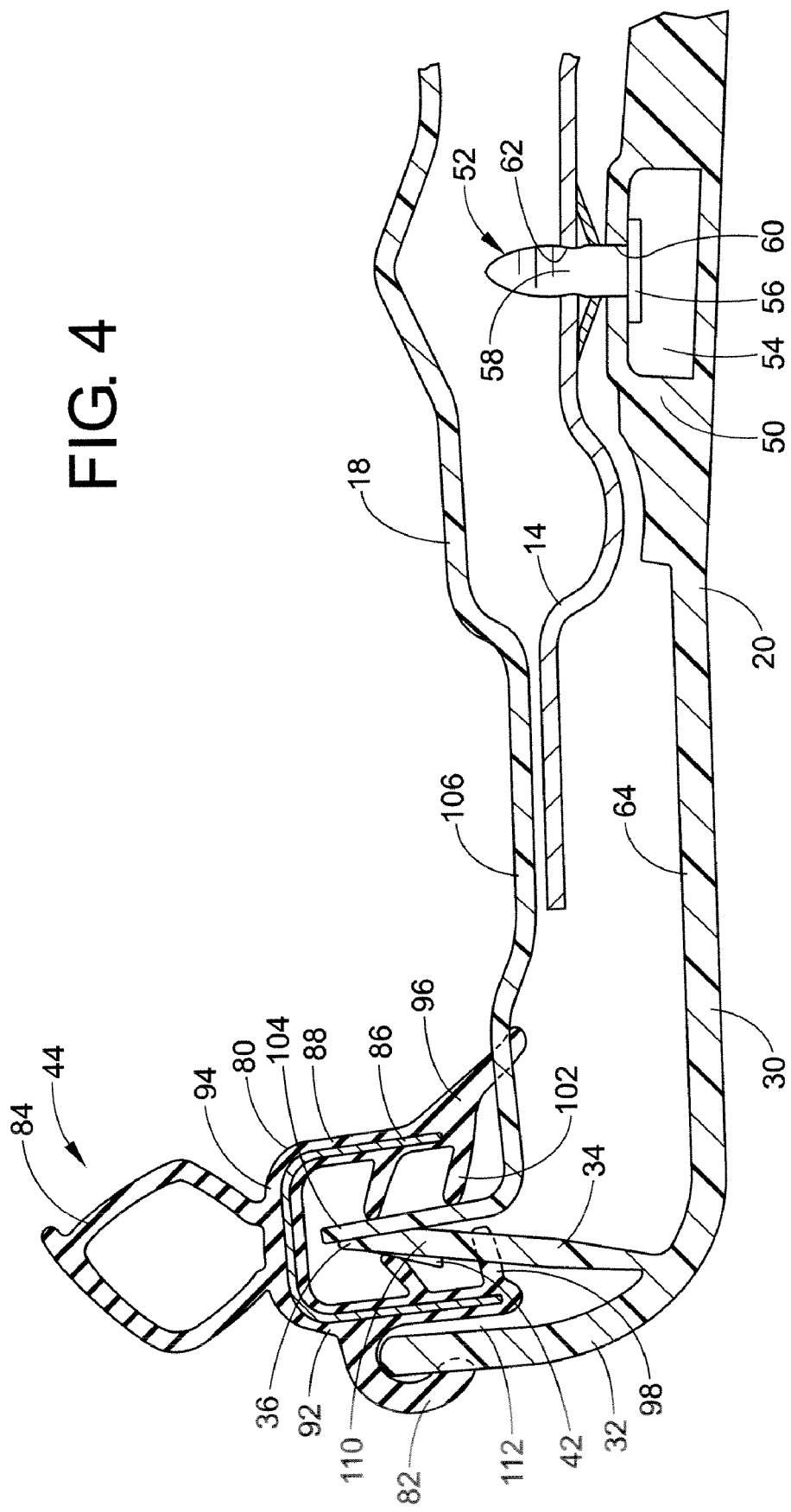
FIG. 4 is a cross-sectional view taken through the garnish, the upper rear roof rail, the lower rear roof rail and a seal attached to the garnish and the upper rear roof rail.

With reference to FIG. 2, the garnish 20 includes a base section 30, an outer (rear) wall 32 projecting away from the base section, and a tab 34, which can be resilient, projecting away from the base section and spaced from the outer wall (see FIGS. 3 and 4). In the depicted embodiment, the garnish 20 is an integrally formed molded piece of plastic that includes two tabs 34, though any number of tabs could be employed. As more clearly seen in FIG. 4, the outer wall 32 and the tabs 34 are integrally formed with and disposed generally normal to the base section 30. In a slightly different configuration, the tabs 34 can also connect with and include a portion that extends away from the outer wall 32. With reference to the illustrated embodiment, the tabs 34 are spaced laterally from one another, which is also along a longest dimension of the outer wall 32, and are disposed generally adjacent to the outer wall 32.

With reference to FIG. 3, each tab 34 includes a distal 36 spaced from the base section 30. Each tab 34 has a first thickness, measured generally perpendicular to the transverse direction, adjacent the distal end 36 and a second thickness, measured generally perpendicular to the transverse direction, spaced from the distal edge 36 of the tab 34 going toward the base section 30 of the garnish 20. The first thickness is less than the second thickness and, in the illustrated embodiment, the tab 34 gets progressively thinner going towards the distal edge 36 of the tab 34.

Each tab 34 further includes an opening 38 extending through the tab in a direction generally perpendicular to the transverse direction. The opening 38 is spaced from the distal edge 36 of the tab going toward the base section 30. In the illustrated embodiment, each tab 34 includes two openings 38 that extend through the tab. Each tab 34 also includes a ramped section 42 having a thinnest section adjacent the distal edge 36 of the tab 34. The ramped sections 42 (two are shown in the illustrated embodiment) facilitate insertion of a weatherseal 44 (FIG. 4) over the tab 34 for connection with the lower garnish 20. The thicker lower edge of the ramped sections 42 also makes it difficult to remove the weatherseal 44 after it has been attached. The greatest thickness, measured generally perpendicular to the transverse direction, of the ramped section 42, which in the depicted embodiment is measured from the rear face 46 of the ramped section at its lower end to the rear face 48 of the of the tab 34, is between about 0.2 mm and about 2 mm.

With reference to FIG. 2, the garnish 20 also includes clip receiving regions 50 that extend upwardly toward the rear roof rails 14,18 and are integrally formed with the base section 30. The clip receiving regions 50 are each configured to receive a clip 52 for connecting the garnish 20 with the lower rear roof rail 14, which is a portion of the vehicle body. With reference to FIG. 4, each clip receiving region 50 includes a cavity 54 for receiving and retaining a head 56 of the clip 52. A shank portion 58 of the clip 52 extends through an opening 60 formed in each clip receiving region 50. The shank portion 58 of the clip 52 also extends through respective openings 62 formed in the lower rear roof rail 14 for attaching the garnish 20 to the lower rear roof rail 14.

With reference to FIG. 2, due to the design of the garnish 20 and the lower rear roof rail 14, a section 64 (designated as the region rearward of dashed line 66 in FIG. 2) cantilevers away from the lower rear roof rail 14 (see also FIG. 4). In the illustrated embodiment, the clip receiving regions 50 are disposed nearer an edge (forward) 68 of the garnish 20 that is opposite the outer wall 32. This results in the section 64 of the garnish 20 cantilevering away from the lower rear roof rail 14. Because of this section 64, the garnish 20 can attach to the upper rear roof rail 18 using the weatherseal 44 in a manner that will be described in more detail below. This connection supports the garnish 20 where the weatherseal 44 attaches the garnish 20 to the upper rear roof rail 18 and where the clips 52 attach the garnish 20 to the lower rear roof rail 14.

The base section 30 can also include integrally formed gussets 70 (only shown in FIG. 3, not shown in FIG. 2) to provide additional rigidity to the garnish 20, if desired. Additional clips 72, or fastening members, can be provided on the lateral edges of the garnish 20 or affixing the garnish to the vehicle body.

With reference to FIG. 4, the weatherseal 44, also referred to as simply the seal, mounts to the upper rear roof rail 18 and the garnish 20 by receiving and engaging the tab 34. The seal 44 includes a base portion 80, a tongue 82 extending away from the base portion and a seal portion 84 extending away from the base portion 80. The base portion 80 can be an elastomer or rubber-like material that is extruded on an elongate metal carrier 86 and has a generally U-shaped configuration in cross-section (taken normal to the lateral direction).

The base portion 80 includes an interior section 88, an exterior section 92, and an interconnecting section 94 that connects the interior section to the exterior section. The seal portion 84 can also be extruded elastomer or rubber-like material and is generally a tubular hollow member that extends upwardly from the base section 80. The tongue 82 is generally upside down L-shaped in cross section and extends from the exterior section 92 near where the exterior section meets the interconnecting section 94. A lower lip 96 can extend downwardly and inwardly from a lower edge of the interior section 88. Exterior resilient fingers 98 extend inwardly from the exterior section 92 and interior resilient fingers 102 extend inwardly from the interior section 88. The fingers 98 and 102 engage the tab 34, and therefore the garnish 20, and the upper rear roof rail 18 in a manner described in more detail below. The fingers 98 and 102 can extend along the length of the seal 44.

The seal 44 mounts to the upper rear roof rail 18 and the garnish 20 by receiving the tab 34 between the interior section 88 and the exterior section 92 of the base 80. The seal 44 also receives the outer wall 32 of the garnish 20 between the tongue 82 and the exterior section 92. In the illustrated embodiment, the upper rear roof rail 18 also includes an outer wall 104 that extends upwardly from a base section 106, and this outer wall 104 is received between the interior section 88 and the exterior section 92 of the base 80 of the seal 44. In the illustrated embodiment, the outer wall 104 of the upper rear roof rail 18 abuts the tab 34 and the seal 44 and connects the upper rear roof rail 18 with the garnish 20. Accordingly, a portion of the vehicle body frame, i.e. the upper rear roof rail 18, can extend towards the tab 34 and abut the tab 34 to allow the seal 44 to attach the garnish 20 to a portion of the vehicle body frame.

With the seal 44 mounted to the garnish 20, the tongue 82 extends over the outer wall 32 of the lower garnish 20. The tab 34 includes a seal attachment section 110 that engages the resilient fingers 98 and 102. Some of the resilient fingers 98 can be received in the openings 38 formed in each tab 34. The seal attachment section 110 is configured to provide a location for attaching the U-shaped base portion 80 of the seal 44 to the tab 34. The seal attachment section 110 and the outer wall 32 of the garnish 20 define a space 112 that is configured to receive a section, the exterior section 92 in the illustrated embodiment, of the base portion 80 of the seal 44 while allowing tongue 82 of the seal to extend over the outer wall 32 of the garnish 20. The seal attachment section 110 is also generally normal to the base section 30 of the garnish 20.

The seal attachment section 110 tapers from a thinnest section at the distal edge 36 of the tab 34 toward a thicker section going toward a base section 30 of the garnish 20. As more clearly seen in FIG. 4, the ramped section 42 and the thin distal edge 36 of the tab 34 facilitate insertion of the seal 44 onto the tab 34 by cooperating with the flexible fingers 98 and 102. The ramped section 42 also inhibits removal of the seal 44. The space 112 between the outer wall 32 of the garnish 20 and the seal attachment section 110 of the tab 34 also spaces the seal 44 with respect to the outer wall 32 of the garnish 20 to locate the seal portion 84 of the seal 44 near the outer wall of the garnish 20. Accordingly, the distal edge 36 of the tab 34 can be spaced less than about 8 mm from the outer wall 32 of the garnish 20 in a direction generally perpendicular to the transverse direction, and more preferably between about 3 mm to about 8 mm from the outer wall 32 of the garnish 20. Near the lower end (base) of the tab 34, the tab 34 can be spaced less than about 5 mm from the outer wall 32 of the garnish 20 in a direction generally perpendicular to the transverse direction, and more preferably between about 1.5 mm to about 4.5 mm from the outer wall 32 of the garnish 20. When the tailgate (not shown) of the vehicle is closed, the seal portion 84 of the seal 44 is appropriately located for sealing against the tailgate. Accordingly, the garnish 20 includes a feature, e.g. the tab 34, that is spaced from the outer wall 32 of the garnish for attaching the garnish to the vehicle body 10 and for acting as a seal spacer.

The tab 34 is also resilient. The resilience of the tab 34 ensures that the tab 34 maintains contact with the vehicle body, e.g. the upper rear roof rail 18. This provides the garnish 20 a rigid support to lean against. When the garnish 20 is attached to the lower rear roof rail 14, via the clips 52, the tabs 34 are pushed toward the outer wall 32 of the garnish 20. A generally horizontal force (per the orientation of FIG. 4) results due to the resilience of the tab 34, which acts against the outer wall 104 of the upper rear roof rail 18. The tab 34 helps to control the spacing and location of the garnish 20 in relation to the vehicle body, e.g. upper rear roof rail 18. This makes the seal 44 easier to install onto the garnish 20 and body.

The seal 44 and the tab 34 for connecting the garnish 20 to the vehicle body have been described with reference to a rear port of a vehicle. Nevertheless, as will be appreciated and understood by those skilled in the art, the tabs 34 can be located on other garnishes located in other areas of the vehicle body, e.g. door openings and hood openings. In any case, a vehicle garnish and seal assembly have been described with reference to particular embodiments. Many modifications and alterations will occur to those after reading the detailed description. The invention is not limited to only those embodiments that are disclosed above. Instead, the invention is broadly defined by the appended claims and the equivalents thereof.

The invention claimed is:

1. A garnish and seal assembly for a vehicle comprising:
a vehicle body;
a garnish mounted to the vehicle body and including a base section, an outer wall projecting away from the base section, and a tab projecting away from at least one of the base section and the outer wall, the tab including a seal attachment section spaced from the outer wall; and
a seal including a base portion having an interior section, an exterior section and an interconnecting section connecting the interior section and the exterior section, the seal further including a tongue and a generally tubular seal body extending away from the base portion, the seal being mounted to the garnish by receiving the seal attachment section between the interior section and the exterior section of the seal base portion and extending the tongue over the outer wall.

2. The assembly of claim 1, wherein the outer wall and the tab are integrally formed with the base section.

3. The assembly of claim 1, wherein the tab has a first thickness adjacent a distal edge of the tab and a second thickness spaced from the distal edge going toward the base section, the first thickness being less than the second thickness.

4. The assembly of claim 1, wherein the seal receives and engages a portion of the vehicle body between the interior section and the exterior section of the base portion of the seal.

5. The assembly of claim 4, wherein the portion of the vehicle body abuts the tab.

6. The assembly of claim 5, wherein the tab is resilient and exerts a force against the portion of the vehicle body that abuts the tab.

7. The assembly of claim 1, wherein the garnish includes at least two tabs each projecting away from the base section and spaced from the outer wall.

8. The assembly of claim 7, wherein a first tab is laterally spaced from a second tab.

9. The assembly of claim 1, wherein the tab includes an opening through the tab spaced from a distal edge of the tab going toward the base section.

10. The assembly of claim 1, wherein the tab includes a ramped section having a thinner section adjacent a distal edge of the tab.

11. The assembly of claim 1, wherein the tongue extends away from the exterior section of the base portion and the seal portion extends away from the interconnecting section of the base portion.

12. The garnish of claim 11, wherein the seal attachment section and the outer wall define a space, the exterior section of the seal being received in the space.

13. A vehicle garnish comprising:
a base section;
an outer wall integrally formed with and projecting away from the base section;
at least one tab connected with at least one of the base section and the outer wall and including a seal attachment section projecting in a same general direction as the outer wall, the seal attachment section configured to provide a location for attaching an associated seal having a base portion, and a seal portion extending away from the base portion, and the seal attachment section and the outer wall defining a space configured to receive a section of the base portion of the associated seal, the seal attachment section tapering from a thinnest section at a distal edge toward a thicker section going toward the base section; and
at least one clip receiving region provided on the base section and configured to receive an associated clip for connecting the garnish with an associated vehicle body.

14. The garnish of claim 13, wherein the outer wall and the seal attachment section are generally normal to the base section.

15. The garnish of claim 13, wherein the at least one tab includes a first tab and a second tab spaced from the first tab along a longest dimension of the outer wall.

16. The garnish of claim 13, wherein the at least one tab includes an opening spaced from a distal edge of the at least one tab going toward the base section.

17. The garnish of claim 13, wherein the at least one tab includes a ramped section having a thinner section adjacent a distal edge of the at least one tab.

18. The garnish of claim 13, wherein the at least one clip receiving regions is disposed nearer an edge of the garnish that is opposite the outer wall.

19. The garnish of claim 13, wherein the at least one clip receiving region is provided adjacent a lateral edges of the garnish for affixing the garnish to the associated vehicle body.

* * * * *